United States Patent
Krell et al.

(10) Patent No.: US 7,247,589 B2
(45) Date of Patent: Jul. 24, 2007

(54) TRANSPARENT POLYCRYSTALLINE SINTERED CERAMIC OF CUBIC CRYSTAL STRUCTURE

(75) Inventors: Andreas Krell, Dresden (DE); Thomas Hutzler, Dresden (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 71 days.

(21) Appl. No.: 11/038,402

(22) Filed: Jan. 21, 2005

(65) Prior Publication Data

US 2005/0164867 A1 Jul. 28, 2005

(30) Foreign Application Priority Data

Jan. 23, 2004 (DE) .................. 10 2004 004 259

(51) Int. Cl.
*C04B 35/443* (2006.01)
*C04B 35/486* (2006.01)
*C04B 35/505* (2006.01)
*C04B 35/58* (2006.01)

(52) U.S. Cl. ............... 501/120; 501/103; 501/152; 501/96.1; 501/98.4

(58) Field of Classification Search ........... 501/120, 501/152, 103, 96.1, 98.4
See application file for complete search history.

(56) References Cited

U.S. PATENT DOCUMENTS

| | | | |
|---|---|---|---|
| 3,767,745 A | | 10/1973 | Gazza et al. |
| 3,768,990 A | * | 10/1973 | Sellers et al. ............... 65/17.5 |
| 4,273,587 A | * | 6/1981 | Oda et al. ................... 501/153 |
| 4,481,300 A | * | 11/1984 | Hartnett et al. ............ 501/96.1 |
| 4,520,116 A | * | 5/1985 | Gentilman et al. ......... 501/96.1 |
| 4,686,070 A | * | 8/1987 | Maguire et al. ............ 264/1.21 |
| 4,841,195 A | | 6/1989 | De With et al. |
| 5,001,093 A | * | 3/1991 | Roy et al. ................... 501/120 |
| 5,096,862 A | * | 3/1992 | Mathers et al. ............ 501/96.1 |
| 5,152,940 A | * | 10/1992 | Shibata et al. ............. 264/1.21 |
| 5,244,849 A | * | 9/1993 | Roy et al. ................... 501/120 |
| 5,484,750 A | * | 1/1996 | Greskovich et al. ........... 501/86 |
| 6,417,127 B1 | * | 7/2002 | Yamamoto et al. ......... 501/153 |
| 6,844,285 B1 | * | 1/2005 | Wei ............................. 501/152 |
| 7,022,262 B2 | * | 4/2006 | Lee et al. ............. 252/301.4 R |
| 2004/0266605 A1 | * | 12/2004 | Villalobos et al. .......... 501/108 |
| 2006/0100088 A1 | * | 5/2006 | Loureiro et al. ............ 501/152 |

FOREIGN PATENT DOCUMENTS

| | | |
|---|---|---|
| DE | 68906698 | 11/1993 |
| EP | 0334760 | 9/1989 |
| EP | 0447390 | 9/1991 |

OTHER PUBLICATIONS

V.V. Srdic et al., J. Am. Ceram. Soc., vol. 83, No. 8, pp. 1853-1860, 2000.
N. Saito et al., J. Am. Ceram. Soc., vol. 81, No. 8, pp. 2023-2028, 1998.
J.-G. Li et al., J. Am. Ceram. Soc., vol. 83, No. 4, pp. 961-963, 2000.
A. Krell et al., J. Am. Ceram. Soc., vol. 86, No. 1, pp. 12-18, 2003.
K. Tsukuma et al., Advances in Ceramics, vol. 24: Science and Technology of Zirconia III, pp. 287-291, 1988.
D. Agrawal et al., Ceram. Trans., vol. 134, pp. 58-593, 2002.
A.F. Dericioglu et al., J. Europ. Ceram. Soc., vol. 23, pp. 951-959, 2003.
.J. Swab et al., Ceram. Trans., vol. 122, pp. 489-508, 2002.
A. Krell et al., Ceram. Trans., vol. 134, pp. 463-471.

* cited by examiner

*Primary Examiner*—Karl Group
(74) *Attorney, Agent, or Firm*—Greenblum & Bernstein, P.L.C.

(57) ABSTRACT

Transparent polycrystalline sintered ceramic of cubic crystal structure. The invention relates to the field of technical ceramic and relates to transparent polycrystalline sintered ceramics of cubic crystal structure for applications with increased mechanical stress, e.g., as protective or armoring ceramic. Provided are sintered ceramics that combine a high transmission of RIT>75% of the theoretical maximum value with a distinctly improved hardness. Transparent polycrystalline sintered ceramics of cubic crystal structure with a real in-line transmission RIT>75% of the theoretical maximum value measured on 0.8 mm-thick polished plates and for light of a wavelength between 600 and 650 nm, and with an average grain size D in the range of 60 nm<D<10 μm are provided.

12 Claims, No Drawings

TRANSPARENT POLYCRYSTALLINE SINTERED CERAMIC OF CUBIC CRYSTAL STRUCTURE

CROSS-REFERENCE TO RELATED APPLICATIONS

The present application claims priority under 35 U.S.C. §119 of German Patent Application No. 10 2004 004 259.4, filed Jan. 23, 2004, the disclosure of which is expressly incorporated by reference herein in its entirety.

BACKGROUND OF THE INVENTION

1. Field of the Invention

The invention relates to the field of technical ceramic and relates to transparent polycrystalline sintered ceramics of cubic crystal structure for applications with increased mechanical stress, e.g., as protective or armoring ceramic.

2. Discussion of Background Information

The quantity responsible for the transparency of materials is the real in-line transmission (RIT) to be measured from the detected intensity only with a very narrow aperture angle of about 0.5° for the purpose of excluding scattered light.

In the case of lacking or extremely low light absorption, the transmission for optically homogeneous materials such as glass or for monocrystals is limited only by the material-specific reflection $R_s=((n-1)/(n+1))^2$ at the front and back side, respectively, determined by the refractive index n. The resulting theoretical maximum value of the transmission $T_{max}$ is $T_{max}=(1-R)$ where $R=2 R_s/(1+R_s)$ for highly transparent substances, taking into consideration the multiple reflection, or $T_{max}=(1-R_s)^2$ for materials of low transparency, i.e., negligible multiple reflection; $T_{max}$, e.g., for colorless monocrystals such as $Al_2O_3$ (corundum, sapphire; n=1.760 or 1.768) is about 85.8%, for $MgO.Al_2O_3$ spinel (n=1.712-1.736) about 86.9%, for $Y_2O_3$ (n=1.78-1.79) about 85.3%, and for Y—Al garnet (n=1.833) about 84.1%. For $ZrO_2$ (n=1.98-2.2), this limit can vary within a broader range between about 75 and 81%, depending on the composition.

With light transmission through the structure of sintered polycrystalline ceramics, on the other hand, RIT is usually further reduced by the following processes:

1. diffuse scatter at pores (depending on the size and number of the pores), and 2. especially in non-cubic ceramics such as corundum ($\alpha$-$Al_2O_3$), additional light scatter through double refraction at each transition of the light ray from one into the next crystallite of the structure.

The scatter losses must therefore be kept low in all sintered ceramics through the lowest possible residual porosity and through pore sizes that, if possible, are smaller than the wavelength of the light.

Since only this first-named scatter mechanism occurs in cubic sintered ceramics, their transparency is thus not subject to any direct influence of grain size. On the other hand, in particular in materials of non-cubic crystal structure, the second scatter contribution must be reduced either by extreme grain growth (i.e., approaching the monocrystalline state) or by extremely small structure grain sizes. For nanocrystalline structures (e.g., tetragonal $ZrO_2$ with grain sizes around or below 60 nm (V. Srdic et al., J. Am. Ceram. Soc. (2000), 1853-1860), as is well known a high transparency is ultimately given independent of the degree of tetragonal distortion if the manufacturing process is designed so that even the last hundredths of a percent of residual porosity are avoided.

This situation, which differs depending on the crystal structure, explains why no RIT values >70% could be achieved hitherto for the most advanced (finest-grained, low-pore) sinter corundum (trigonal) at thicknesses about or above 1 mm, whereas, e.g., for $MgO.Al_2O_3$ spinel (cubic), measured values of about 80% and thus close to the theoretical maximum were reported. As a particular advantage of very high RIT, it must also be noted that the influence of thickness disappears on approaching the theoretical maximum, whereas vice versa any greater scatter losses naturally increase with the thickness of the light-scattering material and the transparency is then only guaranteed for very thin components. Thus, such an influence of thickness is a clear criterion for the presence of considerable light scatter—i.e., low transparency—and for the origination of any high transmission measured values from a too large aperture angle that makes it impossible to measure the real in-line transmission.

Because of this superiority of cubic materials, attempts were already undertaken early to produce hot-pressed transparent ceramics from such substances, for the purpose of optimizing the mechanical properties at first combined also with the aim of the lowest possible grain growth during the sintering. Examples are $MgO.Al_2O_3$ spinel ceramics with average grain size of about 1 μm (U.S. Pat. No. 3,767,745) and Y—Al garnet ceramics with a grain size of about 5 μm (U.S. Pat. No. 4,841,195). However, none of these developments led to satisfactory transparency values, due to a certain residual porosity in the grain boundaries of these fine-grained structures: U.S. Pat. No. 3,767,745 gives no data for quantifying the degree of transparency of the spinel achieved, while for the above-mentioned garnet a transmission was measured at 589 nm wavelength in spite of a very large aperture angle of 8° (0.14 rad), which transmission only reached max. 57% for, e.g., 0.8 mm-thick plates, which corresponds to just 65% of the theoretical maximum value (U.S. Pat. No. 4,841,195). For fine-grained spinel ceramics with grain sizes of between 2 and 5 μm, such large (unfortunately usually unstated) aperture angles of the light measurement have even led to measuring results of up to 80%, but unlike the real in-line transmission explained above, they do not disclose any actual transparency: in the example of EP 334 760 A1, this becomes clear from the reported considerable influence of thickness on the visible transmission of the sintered spinel, so that to determine the theoretical upper limit correctly, the above-mentioned equation $T_{max}=(1-R_s)^2$ was used for materials of low transparency (without multiple reflection).

As a result, therefore, the special advantage of cubic transparent sintered ceramics of being able to achieve high transmission values generally even with coarser structures, has lead to development being given priority in a direction where attempts are made to eliminate the residual porosity by particularly high sintering temperatures, even when nanocrystalline powder raw materials are being used—while accepting strong grain growth. In this context, production temperatures of 1700° C. for $Y_2O_3$— and Y—Al garnet ceramics are then called "low temperature fabrication," and the ceramics of optimized transparency produced finally exhibit coarse structures with average grain sizes of about 20 μm (N. Saito et al., J. Am. Ceram. Soc. (1998), 2023-2028; J.-G. Li et al., J. Am. Ceram. Soc. (2000), 961-963), in spite of the use of nanopowders (average particle sizes about 70-100 nm). As a result of such extreme grain growth, pores are frequently enclosed in the growing crystallites intragranularly, so that for 1 mm-thick plates—with unspecified quite large aperture angle—the in-line transmission measured at a wavelength of, e.g., 600-650 nm achieves only 42% of the theoretically possible maximum value; thus this transmission, in spite of the advantage of the cubic crystal structure, actually lags behind the values achieved as RIT of about 60% (=70% of the theoretical maximum value) under otherwise similar measuring conditions for trigonal sinter corundum in spite of its double refraction (A. Krell et al., J. Am. Ceram. Soc. (2003) 12-18). Similarly, for cubic Y-stabilized $ZrO_2$, which was doped with titanium to promote the grain growth, the highest transmission is achieved for the most coarse-grained structure of about 150 μm (here by the combination of sintering at 1700° C. with hot isostatic redensification [HIP] at 1500° C.), whereby this achieved maximum value of a (likewise unspecified) transmission through a plate with a thickness of 0.73 mm is only 64% (K. Tsukuma et al., Advances in Ceramics, Vol. 24 [Zirconia III, 1988], 287-291).

As for the rest, the latter result for transparent $ZrO_2$ ceramic shows that limits are set on the actually achievable transmission even for conventional cubic sintered ceramic of $ZrO_2$, these limits being of the type that vice versa similar transparency results should also be achievable with tetragonal $ZrO_2$, as long as the c/a axial ratio of the elementary cell deviates by not more than about 1.5% from value 1 (=cubic), and therefore no considerable deviation occurs from the approximately cubic (optically isotropic) behavior.

Nor have alternative sintering processes led hitherto to the development of fine-grained cubic transparent ceramics. Thus, for a cubic AlON ceramic produced by microwave sintering, the highest transmission was produced precisely with the highest sintering temperature (1800° C.), which led to an average grain size of 40-50 μm and limited the realized light transmission in the visible range to low values of about 43%, even at a sample thickness of only 0.6 mm (D. Agrawal et al., Ceramic Trans. Vol. 134 (2002), 587-593).

With $MgO \cdot Al_2O_3$ spinel, although high transmission values were achieved, RIT values in the visible range were about 60% for 2 mm-thick plates after the combined use of hot pressing (1400-1500° C.) with HIP at 1900° C. (A. F. Dericioglu et al., J. Europ. Ceram. Soc. (2003) 951-959) or, with the addition of 1.5% of Li doping, also a transmission close to the theoretical limit after hot pressing at 1410° C. followed by HIP at 1500° C. (EP 447390 B1), but even for these ceramics the average structure grain size in the first example was always >150 μm, and in the second example it is given as less than 150 μm, starting from a powder described as "submicron."

These coarse structures reduce even further the mechanical characteristics of the cubic ceramics, which are already at a substance-related (as a monocrystal) disadvantage compared with the trigonal corundum, and lead to lower strengths and readier dislocation activity with low hardness. Thus, e.g., the microhardness (test load 200 g) of transparent AlON ceramic with 150 μm grain size is only 13.8 GPa, that of transparent spinel with bimodal grain size distribution of between 10-20 and 100-200 μm is as low as 12.1 GPa (J. J. Swab et al., Ceramic Trans. Vol. 122 [0015], 489-508), which must be compared with the hardness values of the same measurement for transparent sinter corundum of >20 GPa and is of particular significance for its use as a protective ceramic: systematic testing with sinter corundum of graduated grain sizes and hardness have shown that the mass effectiveness of the ceramics characterizing the anti-ballistic protective effect declines by about ⅓ with a hardness dropping from 21 to 12 GPa (A. Krell et al., Ceramic Trans. Vol. 134 [0016], 463-471). The coarse-grained cubic sintered ceramics of low hardness known hitherto therefore require thicker components for an equivalent protective effect, which is accompanied by the disadvantage of higher weight.

The disclosures of each the above-cited documents are incorporated by reference herein in their entireties.

SUMMARY OF THE INVENTION

The present invention therefore provides hitherto unknown transparent sintered ceramics of cubic crystal structure that have a higher mechanical loading capacity and that combine a high transmission of RIT>75% of the theoretical maximum value with a distinctly improved hardness.

The present invention relates to transparent polycrystalline sintered ceramic of cubic crystal structure comprising a real in-line transmission RIT>75% of the theoretical maximum value measured on 0.8 mm-thick polished plates and for light of a wavelength between 600 and 650 nm, and with an average grain size D in the range of 60 nm<D<10 μm.

The average grain size D can be in the range of 60 nm<D<5 μm, or in the range of 60 nm<D<2 μm, or in the range of 60 nm<D<1 μm.

The sintered ceramic can be composed of Mg—Al spinel, Al oxynitride, $ZrO_2$, $Y_2O_3$ or Y—Al garnet, or of a mixed structure of these components.

The sintered ceramic can contain up to 5% by wt of additional dopants that are present in the crystal lattice as solid solutions, as a separate phase with crystallite size <250 nm, or in both forms.

The sintered ceramic can be a transparent Mg—Al spinel ceramic having a Vickers hardness of HV10>13 GPa.

DETAILED DESCRIPTION OF THE INVENTION

Turning away from previous developments of high-density cubic transparent ceramics, which all aimed for more coarsely structured structures, the present invention is attained here by transparent polycrystalline sintered ceramics of cubic crystal structure, which unlike the known prior art combine the high relative sintering density of greater than 99.9% required for high light transmission RIT>75% of the theoretical maximum value with a fine-grained structure whose average grain size D is in the range of 60 nm<D<10 μm.

Further increases in hardness are advantageously achieved by structures with 60 nm<D<5 μm, particularly advantageously with 60 nm<D<2 μm, and quite particularly by submicrometer structures with 60 nm<D<1 μm.

In contrast, even finer average grain sizes <60 nm do not contribute to the striven-for improvement in the mechanical characteristics due to the then high frequency of grain boundaries in the volume, and are therefore not according to the invention.

These cubic sintered ceramics achieve the combination according to the invention of fine-grained structures with high relative density >99.9% at comparatively low production temperatures (in the example of Mg—Al spinel typically <1500° C.); for this, the shaping of the products takes place before the sintering by processes known in principle, such as, e.g., the casting of well-dispersed low-viscosity suspensions (e.g., gel casting, slip casting, pressure filtration, centrifugal casting), by extrusion or dry pressing (monoaxial or cold isostatic).

Particularly advantageous solutions in the sense of the combination of high transparency and hardness result based on the substances Mg—Al spinel, Al oxynitride, $ZrO_2$, $Y_2O_3$ or Y—Al garnet, or mixed structures of these components. For the reasons explained above, $ZrO_2$ sintered ceramics of the above-mentioned low tetragonal distortion (c/a with max. 1.5% deviation from the value 1) are hereby included.

The ceramics can contain up to 5% by wt. of additional dopes, which are present in the crystal lattice as solid solutions, as a separate phase with crystallite size <250 nm, or in both forms.

Mg—Al spinel ceramics according to the invention of max. hardnesses >13 GPa are particularly advantageous for applications in the field of armoring- and protective ceramics up to thermomechanically stressed windows of high transparency in the visible and the infrared range.

With the solution according to the invention, actually transparent polycrystalline sintered ceramics with high mechanical characteristics are attainable for the first time As far as the choice of their material is concerned, such sintered ceramics are limited only by the criterion of a cubic crystal structure.

In addition to the comparatively high transparency, the ceramics according to the invention also feature high mechanical properties, which are realized through the comparatively low particle size with minimum residual porosity. Although according to prior art magnesium oxide/aluminum oxide spinels with average grain sizes of less than 150 μm are already disclosed in principle (EP 447390), the range according to the invention of the average grain size in the sintered ceramic is not stated in the prior art, nor is an indication of a smaller grain size evident. This is also significant since too fine an average grain size <60 nm also no longer leads to the improvement in the mechanical properties.

Moreover, it is not currently possible to produce industrially actually transparent sintered ceramics with high mechanical properties, nor are they available on the market. This is also in particular the case because the technical direction of development for many years has been to attempt improvements in the transparency of sintered ceramics by reducing the number of pores precisely by long sintering at high temperatures. Such a sintering necessarily leads to an increased grain growth and thus to the deterioration of the mechanical properties of such sintered ceramics.

The invention is explained in more detail below by an exemplary embodiment.

EXAMPLE

A commercial $MgO.Al_2O_3$ spinel powder with 28 m²/g specific surface was used. After dispersion in an aqueous environment, plate-like sample bodies were formed from this raw material. To produce transparent material, a low temperature of only 1480° C. pressureless sintering was combined with a subsequent hot isostatic redensification (HIP) at 1450° C.

The resulting relative density was >99.9% (which cannot be specified more precisely with customary density measuring methods); the average grain size (determined as 1.56 times the average chord length) was 1.39 μm.

These plates were ground plane-parallel, first with a diamond grinding disk with 91 μm grain size, then with a finer graining of 46 μm. To further reduce the surface roughness, the plates were lapped or polished with increasingly finer diamond grain of 9 μm, 6 μm, and finally 3 μm. The thickness of the samples was finally 0.8 mm.

The real in-line transmission RIT=78% (=90% of the theoretical maximum value) was determined with red light (640 nm) by a Gigahertz-Optik "LCRT-2006-06R/T Messaerät integral" spectrophotometer. Using this, RIT was determined by detecting only the portion of transmitted light within an angle of not more than 0.57° around the straight axis.

The Vickers microhardness with a 200 g test load is HV0.2=14.8±0.29 GPa, as macrohardness is HV10=13.8±0.09 GPa, and thus significantly exceeds known hardnesses of conventional transparent sintered spinel ceramics.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. Transparent polycrystalline sintered ceramic composed of Mg—Al spinel, Al oxynitride, $ZrO_2$, $Y_2O_3$ or Y—Al garnet, or of a mixed structure of these components, of cubic crystal structure, comprising a real in-line transmission RIT>75% of the theoretical maximum value measured on 0.8 mm-thick polished plates and for light of a wavelength between 600 and 650 nm, and
   wherein when the sintered ceramic is composed of Mg—Al spinel, Al oxynitride, $ZrO_2$, or $Y_2O_3$, or of a mixed structure of these components, the average grain size D is in the range of 60 nm<D<10 μm, and
   wherein when the sintered ceramic is composed of Y—Al garnet, the average grain size D is in the range of 60 nm<D<1 μm.

2. Sintered ceramic according to claim 1, wherein when the sintered ceramic is composed of Mg—Al spinel, Al oxynitride, $ZrO_2$, or $Y_2O_3$, or of a mixed structure of these components, the average grain size D is in the range of 60 nm<D<5 μm.

3. Sintered ceramic according to claim 1, wherein when the sintered ceramic is composed of Mg—Al spinel, Al oxynitride, $ZrO_2$, or $Y_2O_3$, or of a mixed structure of these components, the average grain size D is in the range of 60 nm<D<2 μm.

4. Sintered ceramic according to claim 1, wherein when the sintered ceramic is composed of Mg—Al spinel, Al oxynitride, $ZrO_2$, or $Y_2O_3$, or of a mixed structure of these components, the average grain size D is in the range of 60 nm<D<1 μm.

5. Sintered ceramic according to claim 1, which contains up to 5% by wt of additional dopants that are present in the crystal lattice as solid solutions, as a separate phase with crystallite size <250 nm, or in both forms.

6. Sintered ceramic according to claim 1, in which a transparent Mg—Al spinel ceramic has a Vickers hardness of HV10>13 GPa.

7. Sintered ceramic according to claim 2, which contains up to 5% by wt of additional dopants that are present in the crystal lattice as solid solutions, as a separate phase with crystallite size <250 nm, or in both forms.

8. Sintered ceramic according to claim 2, in which a transparent Mg—Al spinel ceramic has a Vickers hardness of HV10>13 GPa.

9. Sintered ceramic according to claim 3, which contains up to 5% by wt of additional dopants that are present in the crystal lattice as solid solutions, as a separate phase with crystallite size <250 nm, or in both forms.

10. Sintered ceramic according to claim 3, in which a transparent Mg—Al spinel ceramic has a Vickers hardness of HV10>13 GPa.

11. Sintered ceramic according to claim 4, which contains up to 5% by wt of additional dopants that are present in the crystal lattice as solid solutions, as a separate phase with crystallite size <250 nm, or in both forms.

12. Sintered ceramic according to claim 4, in which a transparent Mg—Al spinel ceramic has a Vickers hardness of HV10>13 GPa.

* * * * *